(12) United States Patent
Oya et al.

(10) Patent No.: US 12,318,943 B2
(45) Date of Patent: Jun. 3, 2025

(54) CONTROL DEVICE

(71) Applicant: OMRON Corporation, Kyoto (JP)

(72) Inventors: Taku Oya, Kyoto (JP); Daisuke Matsunaga, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 361 days.

(21) Appl. No.: 17/787,715

(22) PCT Filed: Dec. 16, 2020

(86) PCT No.: PCT/JP2020/046858
§ 371 (c)(1),
(2) Date: Jun. 21, 2022

(87) PCT Pub. No.: WO2021/145124
PCT Pub. Date: Jul. 22, 2021

(65) Prior Publication Data
US 2023/0022312 A1    Jan. 26, 2023

(30) Foreign Application Priority Data
Jan. 16, 2020    (JP) .................................. 2020-005001

(51) Int. Cl.
*B25J 9/16*    (2006.01)

(52) U.S. Cl.
CPC .......... *B25J 9/1671* (2013.01); *B25J 9/1661* (2013.01)

(58) Field of Classification Search
CPC ...... B25J 9/1671; B25J 9/1661; B25J 9/1682; Y02P 90/02
See application file for complete search history.

(56) References Cited

U.S. PATENT DOCUMENTS

| | | | |
|---|---|---|---|
| 9,242,371 B2 * | 1/2016 | Hashiguchi | ............ B25J 9/1674 |
| 2012/0150352 A1 | 6/2012 | Park | |
| 2014/0005835 A1 | 1/2014 | Nishiyama et al. | |
| 2019/0049925 A1 * | 2/2019 | Shimamura | ........ G05B 19/4145 |

(Continued)

FOREIGN PATENT DOCUMENTS

| | | | |
|---|---|---|---|
| CN | 109557895 A | | 4/2019 |
| JP | H10207517 A | * | 8/1998 |

(Continued)

OTHER PUBLICATIONS

Translation of JP_H10207517_A_I (Year: 1998).*

(Continued)

*Primary Examiner* — Adam R Mott
*Assistant Examiner* — Ricardo I Viscarra
(74) *Attorney, Agent, or Firm* — ROSSI, KIMMS & McDOWELL LLP

(57) ABSTRACT

A control device includes a processor that calculates one or more predetermined command values for one or more robots to undergo synchronous control in predetermined control cycles, an output unit that outputs the one or more predetermined command values in each of the predetermined control cycles, and a generator that generates an output signal for a virtual robot. The virtual robot is virtually defined in relation to the synchronous control. The processor calculates the one or more predetermined command values using the output signal for the virtual robot generated by the generator.

2 Claims, 7 Drawing Sheets

(56) References Cited

U.S. PATENT DOCUMENTS

2019/0227534 A1    7/2019  Shimakawa et al.
2023/0099602 A1*   3/2023  Hashiguchi .......... G05B 19/418
                                                        700/245

FOREIGN PATENT DOCUMENTS

JP      2011121171 A     6/2011
JP      2012194662 A    10/2012
JP      2019036043 A     3/2019

OTHER PUBLICATIONS

D. Sun, C. Wang, W. Shang and G. Feng, "A Synchronization Approach to Trajectory Tracking of Multiple Mobile Robots While Maintaining Time-Varying Formations," in IEEE Transactions on Robotics, vol. 25, No. 5, pp. 1074-1086, Oct. 2009, doi: 10.1109/TRO.2009.2027384. (Year: 2009).*
International Search Report issued in Intl. Appln. No. PCT/JP2020/046858 mailed Feb. 16, 2021. English translation provided.
Written Opinion issued in Intl. Appln. No. PCT/JP2020/046858 mailed Feb. 16, 2021. English translation provided.
Extended European Search Report issued in European Appln. No. 20913849.4, mailed Nov. 6, 2023.
Sun et al. "A Synchronization Approach to Trajectory Tracking of Multiple Mobile Robots While Maintaining Time-Varying Formations." IEEE Transactions on Robotics. Oct. 2009: 1074-1086. vol. 25, No. 5.
Turpin et al. "Decentralized Formation Control with Variable Shapes for Aaerial Robots." 2012 IEEE Intrenational Conference on Robotics and Automation (ICRA). May 14-18, 2012: 23-30.
Office Action issued in Chinese Appln. No. 202080089025.7, mailed on Feb. 11, 2025.

* cited by examiner

CONTROL DEVICE

FIELD

The present invention relates to a control device for synchronous control of multiple robots.

BACKGROUND

Factory automation (FA) techniques using control devices such as programmable controllers (PLCs) have been widespread at various production sites. Such a control device may indirectly control, in addition to directly controlling a control target, a control target through another device by providing a control command to the other device. Control systems including multiple dedicated devices are to integrate such devices into fewer control devices. For example, with the technique described in Patent Literature 1, a central processing unit (CPU) module in a PLC executes a motion computation program and a user program in synchronization.

Patent Literature 2 describes a technique for performing control computations in accordance with multiple programs in different execution formats with a single control device. For example, this technique computes command values for a program in one format in which the program is fully executed per control cycle and for a program in another format in which parts of the program are sequentially executed in accordance with intermediate codes generated through interpretation of each part of the program. The computed command values are output together per control cycle.

CITATION LIST

Patent Literature

Patent Literature 1: Japanese Unexamined Patent Application Publication No. 2012-194662
Patent Literature 2: Japanese Unexamined Patent Application Publication No. 2019-36043

SUMMARY

Technical Problem

To perform synchronous control of multiple robots with a single control device, multiple target robots are typically connected electrically to the control device, and a program intended for synchronous control of the multiple robots is executed while communication is being enabled between each robot and the control device. This allows appropriate transmission and reception of control signals between the control device and each robot during execution of the program. Once one of the multiple robots is excluded for some reason (e.g., for maintenance) in this control system, the number of robots to be controlled with the program can differ from the number of robots actually connected to the control device. This may disable the program from being executed appropriately when the program remains unchanged after the robot is excluded.

In situations different from the above, the number of robots to be controlled with the program for synchronous control can differ from the number of robots actually connected to the control device. For example, the number of robots to be controlled with the program may be greater than the number of robots actually connected to the control device.

In response to the above issue, one or more aspects of the present invention are directed to a technique for appropriately performing synchronous control of multiple robots although the number of robots to be controlled with the program for synchronous control differs from the number of robots actually connected to the control device.

Solution to Problem

In response to the above issue, a control device according to one or more embodiments of the present invention performs synchronous control of one or more robots and generates an output signal for a virtual robot defined virtually in relation to the synchronous control. This structure eliminates inconvenience in control caused by a difference in number between robots to be controlled with the program for synchronous control and robots actually connected to the control device.

More specifically, a control device according to an aspect of the present invention includes a processor that calculates one or more predetermined command values for one or more robots to undergo synchronous control in predetermined control cycles, an output unit that outputs the one or more predetermined command values in each of the predetermined control cycles, and a generator that generates an output signal for a virtual robot. The virtual robot is virtually defined in relation to the synchronous control. The processor calculates the one or more predetermined command values using the output signal for the virtual robot generated by the generator.

The above virtual robot is not a real robot and is virtually defined in the synchronous control performed by the above control device. Thus, although the number of robots to be controlled with the program for synchronous control differs from the number of robots actually connected to the control device, a virtual robot is incorporated into the calculation process for the predetermined command values for synchronous control to eliminate inconvenience in control resulting from the difference. The control device with the above structure includes a generator that generates an output signal for the virtual robot.

More specifically, in a first aspect of the present invention, the control device may further include an obtainer that obtains an output signal for a specific robot of the one or more robots in synchronous control of the one or more robots performed through execution of a program, and a detector that detects the specific robot of the one or more robots being excluded from the synchronous control. The generator may generate the output signal for the specific robot obtained by the obtainer in the synchronous control that has been performed as the output signal for the virtual robot. In response to the detector detecting the specific robot being excluded, the processor may continue to execute the program to control the one or more robots using the output signal for the virtual robot while the specific robot is being excluded to calculate the one or more predetermined command values.

In the above structure, once a robot among one or more robots to undergo synchronous control is excluded, the robot is a missing target in the synchronous control. Being excluded herein for any reason refers to being no longer a control target to be controlled by the control device. Being excluded herein includes, for example, being electrically disconnected from the control device or being disabled from operating due to a failure in the robot. Such a missing target in the synchronous control can cause the synchronous control to be performed inappropriately based on one or more predetermined command values for synchronous control calculated with the method defined for when the target is not missing and output from the output unit. This may cause a control error. To avoid such a control error, the user may modify the program for synchronous control. The workload for this modification is not small.

As described above, once the detector detects a robot being excluded from the synchronous control, the processor uses an output signal generated by the generator for a virtual robot for calculating one or more predetermined command values. The output signal generated for the virtual robot is the same as the signal obtained by an obtainer in the synchronous control executed in the past, or more specifically, in the synchronous control executed without the robot being excluded. In other words, the virtual robot can be identified with the excluded robot, and the output signal generated for the virtual robot can be identified with an output signal for the excluded robot. The processor uses the output signal for the virtual robot to create a pseudo state in which the specific robot is not being excluded. This enables continuous execution of the program for the synchronous control without causing any control error and enables calculation of one or more predetermined command values. This enables the synchronous control of one or more robots including the virtual robot that replaces the specific robot without the program being modified, thus reducing the workload on the user. The output signal for the virtual robot can be identified with the output signal for the specific robot. Thus, the synchronous control over one or more robots including the virtual robot that replaces the specific robot can be continued without being affected by individual differences between these robots, or in other words, without being affected by differences between the specific robot and the virtual robot. This allows appropriate synchronous control to be performed when the specific robot is excluded.

More specifically, in the control device according to a second aspect of the present invention, the generator may generate the output signal for the virtual robot distinguishable from the one or more robots. The processor may use the output signal for the virtual robot generated by the generator to calculate the one or more predetermined command values for the one or more robots to undergo synchronous control to synchronize an operation of the virtual robot and an operation of each of the one or more robots. This corresponds to when the number of robots to be controlled is greater than the number of robots actually connected to the control device. To perform the synchronous control of multiple robots, the virtual robot serves as a reference for the synchronous control. The virtual robot serving as a reference for the control facilitates creation of the program for the synchronous control.

In the above control device, the processor may calculate the one or more predetermined command values in each of the predetermined control cycles in accordance with an intermediate code generated by executing a program conforming to a predetermined execution format being executed sequentially and interpreting at least a part of the program with an interpreter. The processor may further execute a program conforming to another execution format being executed fully in execution in each of the predetermined control cycles to calculate another command value for controlling another control target. The output unit may output the one or more predetermined command values calculated by the processor to perform synchronous control of the one or more robots and the other control target. As described above, the control device includes the programs in different execution formats. This allows the programs in different execution formats to be usable, from which the user can appropriately select a program suitable for controlling the robots or other control targets, thus increasing the convenience of the control device.

Advantageous Effects

Although the number of robots to be controlled with the program for synchronous control differs from the number of robots actually connected to the control device, the synchronous control of the robots can be performed appropriately.

DETAILED DESCRIPTION

Example Use

Figure 1:
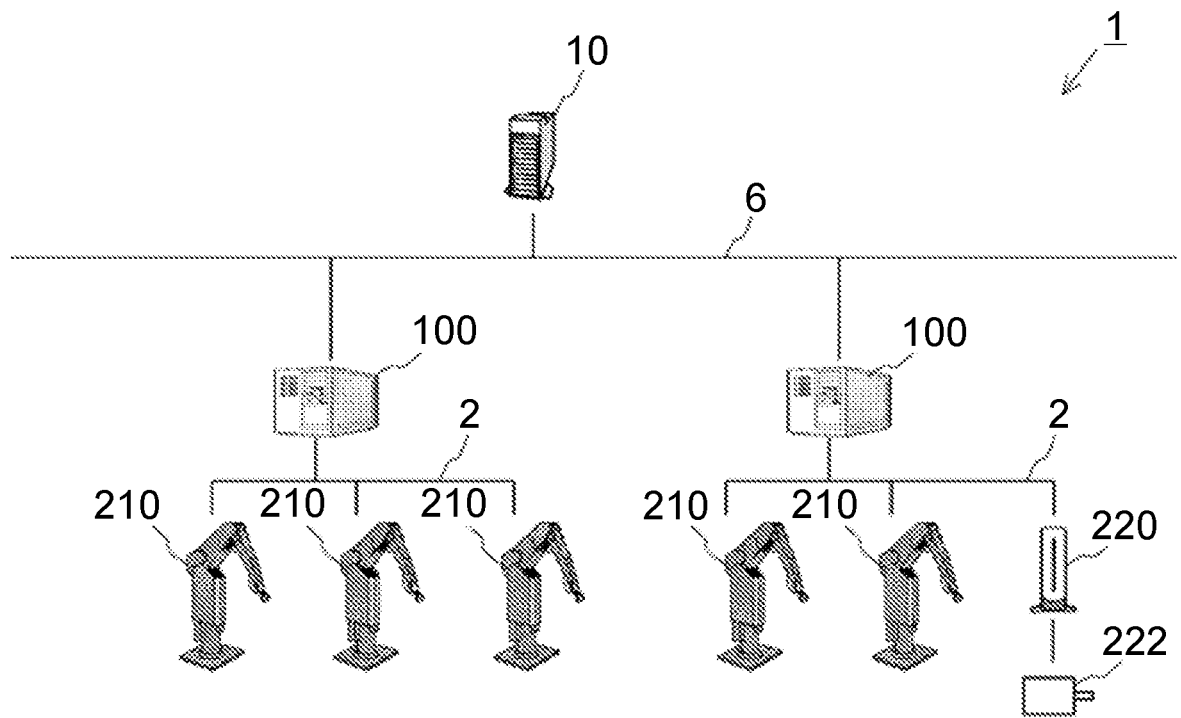
FIG. 1 is a schematic diagram of a control system including an integrated controller.
Figure 2:
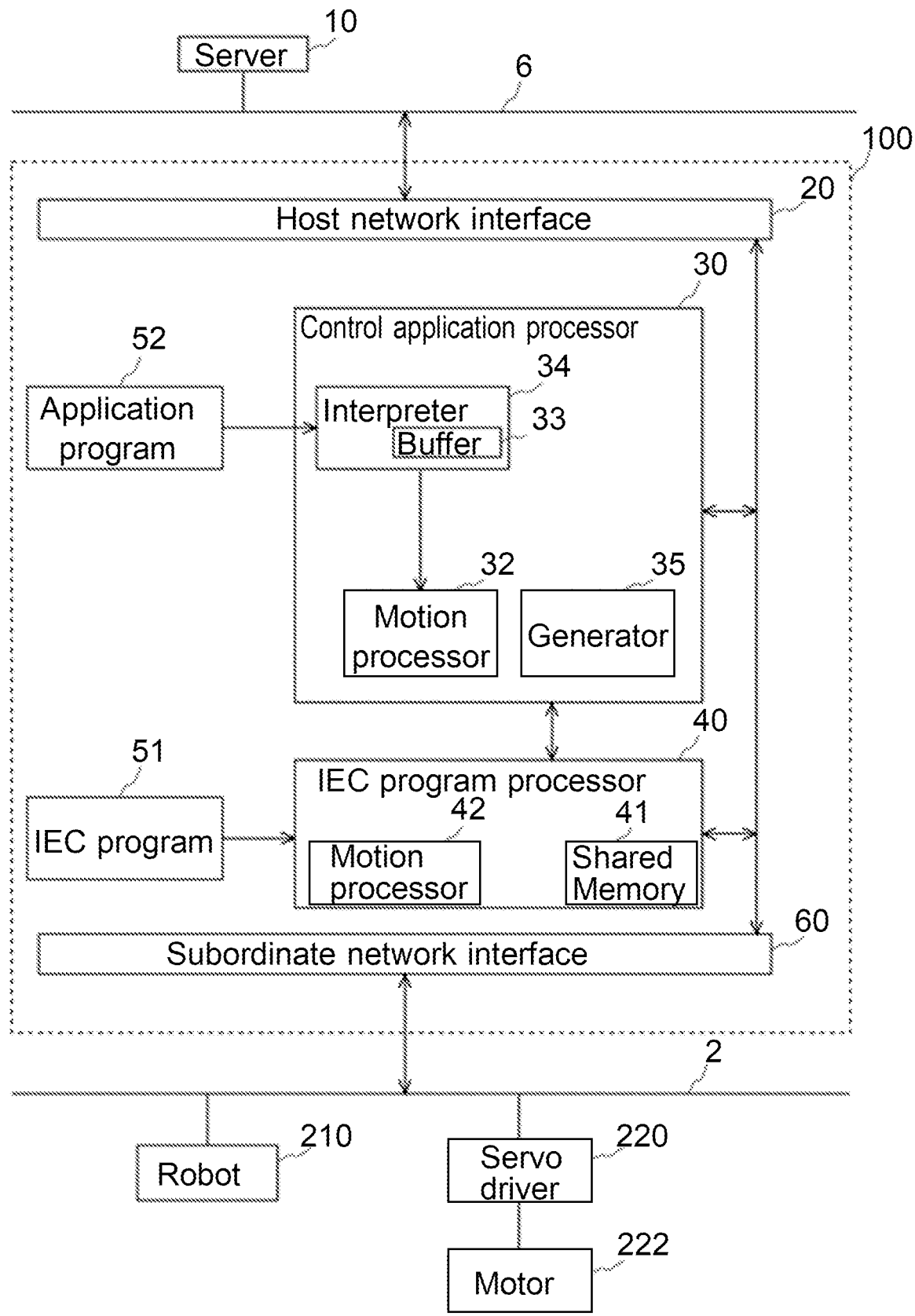
FIG. 2 is a functional block diagram of the integrated controller, describing its functions.

An example use of a control device according to an embodiment will now be described with reference to FIGS. 1 and 2. FIG. 1 is a schematic diagram of a control system 1 including control devices 100. FIG. 2 is a functional block diagram of each control device 100, describing its functions.

Each control device 100 corresponds to an industrial controller that controls control targets included in various facilities or devices. The control device 100 is a computer that performs control computations described later. The control device 100 may be connected to various field devices through a field network 2. The field devices include, for example, an actuator that physically acts on, for example, a production device or a production line (hereafter, collectively referred to as a field) and an input-output device that transmits and receive information to and from the field. In the example shown in FIG. 1, the field devices are robots 210, a servo driver 220, and a motor 222. The servo driver 220 drives the motor 222 in accordance with command values (e.g., a position command and a speed command) from the corresponding control device 100. Examples of the robot 210 include a parallel robot, a selective compliance assembly robot arm (SCARA) robot, and an articulated robot. The control device 100 can thus integrally control the robots 210, the servo driver 220, and the motor 222. The control device 100 will be described in detail later. As shown in FIG. 1, the control device 100 may control multiple robots 210 alone, or may control the robots 210 as well as the servo driver 220 and the motor 222.

The control device 100 transmits and receives data to and from one or more field devices through, for example, the field network 2. The field network is generally referred to as a field bus, but is referred to as a field network herein for simplicity of explanation. The control device 100 performs an input process for collecting data collected or generated by various field devices (hereafter, also referred to as input data), a calculation process for generating data such as commands to field devices (hereafter, also referred to as output data), and an output process for transmitting the generated data to target field devices.

The field network 2 may be a bus or a network that allows pre-timed communications for guaranteed data arrival time. For example, EtherCAT (registered trademark) is known as an example of such a bus or network that allows pre-timed communications. Data transmitted and received between the control device 100 and the field device through the field network 2 is updated in very short cycles of the order of several hundred microseconds to several ten milliseconds. The process for updating the data is also referred to as an input-output refresh.

The control device 100 is also connected to another device through a host network 6. The host network 6 may be Ethernet (registered trademark) or EtherNet/IP (registered trademark), which is a typical network protocol. More specifically, one or more servers 10 may be connected to the host network 6. Examples of the servers 10 include a database system and a manufacturing execution system (MES). The MES obtains information from a production device or a facility as a control target to monitor and manage the entire production. The MES can also handle information such as order information, quality information, or shipping information. Instead of a server, a device that provides information services may be connected to the host network 6.

Referring now to FIG. 2, the structure of each control device 100 will be described. The control device 100 is a computer that performs predetermined control computations as described above, and includes a processor and a memory for the control computations. The processor includes a central processing unit (CPU), a micro processing unit (MPU), and a graphics processing unit (GPU). The processor may include multiple cores, or the computer may include multiple processors. Examples of the memory include a volatile storage such as a dynamic random-access memory (DRAM) or a static random-access memory (SRAM) and a nonvolatile storage such as a hard disk drive (HDD) or a solid-state drive (SSD). The processor reads various programs from the memory and executes the programs to perform appropriate control or various other processes (described later) on a control target. In addition to the system program for implementing basic functions, the memory stores user programs (an IEC program 51 and an application program 52) designed in accordance with a production device or a facility as a control target.

In one or more embodiments of the present disclosure, the overall IEC program 51 is scanned per execution for calculating one or more command values per execution. The IEC program 51 typically contains a program including one or more commands described in accordance with the international standard IEC61131-3 defined by the International Electrotechnical Commission (IEC). The IEC program 51 contains commands for sequence control and motion control. The IEC program 51 is in an execution format in which the overall program is executed (scanned) per control cycle, and is suitable for instantaneous and speedy control. The application program 52 in one or more embodiments of the present disclosure is a control program for performing specific processing or a specific operation with a robot, and contains a program including one or more commands for implementing a control application with the robot. The application program 52 is distinguished from the IEC program 51. In one example, the application program 52 for robot control is an interpreter described in a robot language executed sequentially line by line. The control device 100 may control the robot using the IEC program 51.

As shown in FIG. 2, the control device 100 includes a control application processor 30, an IEC program processor 40, a host network interface 20, and a subordinate network interface 60. The subordinate network interface 60 mediates data transmitted and received between the IEC program processor 40 and the field devices connected through the field network 2 and between the control application processor 30 and the field devices. The host network interface 20 mediates data transmitted and received between the IEC program processor 40 and the server 10 connected through the host network 6 and between the control application processor 30 and the server 10. For example, the control device 100 receives a command such as a production start or a production end from the server 10 connected through the host network 6. The server 10 may transmit information such as recipe information (information including parameters appropriate for production) and an application program for running the control application to the control device 100.

The IEC program processor 40 executes (scans) the IEC program 51 per predetermined control cycle and calculates one or more command values. More specifically, the IEC program processor 40 calculates command values per control cycle in accordance with the IEC program 51. In one or more embodiments of the present disclosure, the IEC program 51 is executed to control a predetermined device including the motor 222. A motion processor 42 calculates command values per control cycle in accordance with a motion command contained in the IEC program 51. More specifically, the motion command contained in the IEC program 51 includes a command indicating the behavior over multiple control cycles (for example, a command instructing a predetermined device including the motor 222 to have an output for drawing a certain locus). When the motion command is executed, the motion processor 42 calculates command values per control cycle in accordance with the instruction in the executed motion command. In other words, the motion processor 42 outputs command values per control cycle to the predetermined device to implement the behavior instructed by the motion command.

The IEC program processor 40 also includes a shared memory 41. The shared memory 41 stores a part or all of the results of the process performed by the IEC program processor 40. The control application processor 30 can access data stored in the shared memory 41 in the IEC program processor 40. The control application processor 30 may write data into the shared memory 41 in the IEC program processor 40. Such data written by the control application processor 30 is accessible by the motion processor 42.

The control application processor 30 calculates command values for controlling the control application based on, for example, the application program 52 and the recipe information. In one or more embodiments of the present disclosure, the control application processor 30 executes the application program 52 to control the robot 210. The control application processor 30 calculates and outputs command values for the control application in synchronization with the IEC program processor 40 calculating and outputting the command values. In other words, the control application processor 30 calculates the command values for controlling the robots 210 in synchronization with the calculation by the IEC program processor 40. The synchronous processes of the IEC program processor 40 and the control application processor 30 will be described later. To calculate the command values in synchronization with the IEC program processor 40 calculating the command values, the control application processor 30 includes a motion processor 32, a buffer 33, an interpreter 34, and a generator 35.

The interpreter 34 sequentially interprets at least a part of the application program 52, and generates an intermediate code. The interpreter 34 includes the buffer 33 to store the generated intermediate code. In one or more embodiments of the present disclosure, the intermediate code contains a command for calculating command values per control cycle, and may contain one or more commands or one or more functions. The motion processor 32 calculates command values per control cycle in accordance with intermediate codes pre-generated by the interpreter 34 and stored in the buffer 33. Typically, commands (codes) described in the application program 52 are executed sequentially. Thus, the calculation cycle of command values is not guaranteed. However, in one or more embodiments of the present disclosure, the use of the intermediate codes allows the motion processor 32 to calculate command values per control cycle. Commands described in the intermediate codes may include a coordinate system corresponding to each control application.

The control application processor 30 herein may drive and control the single robot 210 or may control multiple robots 210. The motion processor 32 can perform synchronous control of the multiple robots 210. The synchronous control will be described in detail later. The generator 35 is a functional component that generates an output signal for a virtual robot defined virtually in relation to synchronous control between, for example, the robots 210 or between the robots 210 and the servo driver 220. In other words, the generator 35 virtually generates an output signal for a robot for synchronous control to be performed by the control device 100, although the robot is actually missing.

Synchronous Execution of Programs

The control device 100 implements synchronous execution of the IEC program 51 and the application program 52. These programs are executed in synchronization to perform synchronization control of, for example, the robots 210 and the servo driver 220. The interpreter 34 in the control application processor 30 sequentially executes parts of the application program 52 per cycle longer than the control cycle, for example, per cycle twice as long as the control cycle. The motion processor 42 in the IEC program processor 40 and the motion processor 32 in the control application processor 30 calculate command values per same control cycle. Thus, command values are output from the control device 100 in synchronization in the predetermined control cycle. As described above, the IEC program processor 40 and the control application processor 30 each include a motion processor for continuously controlling the movement of the actuator. These motion processors calculate command values in synchronization. This allows the control in accordance with the IEC program 51 and the control in accordance with the application program 52 to be performed in synchronization with the control cycle. Thus, precise control per control cycle can be performed.

Figure 3:
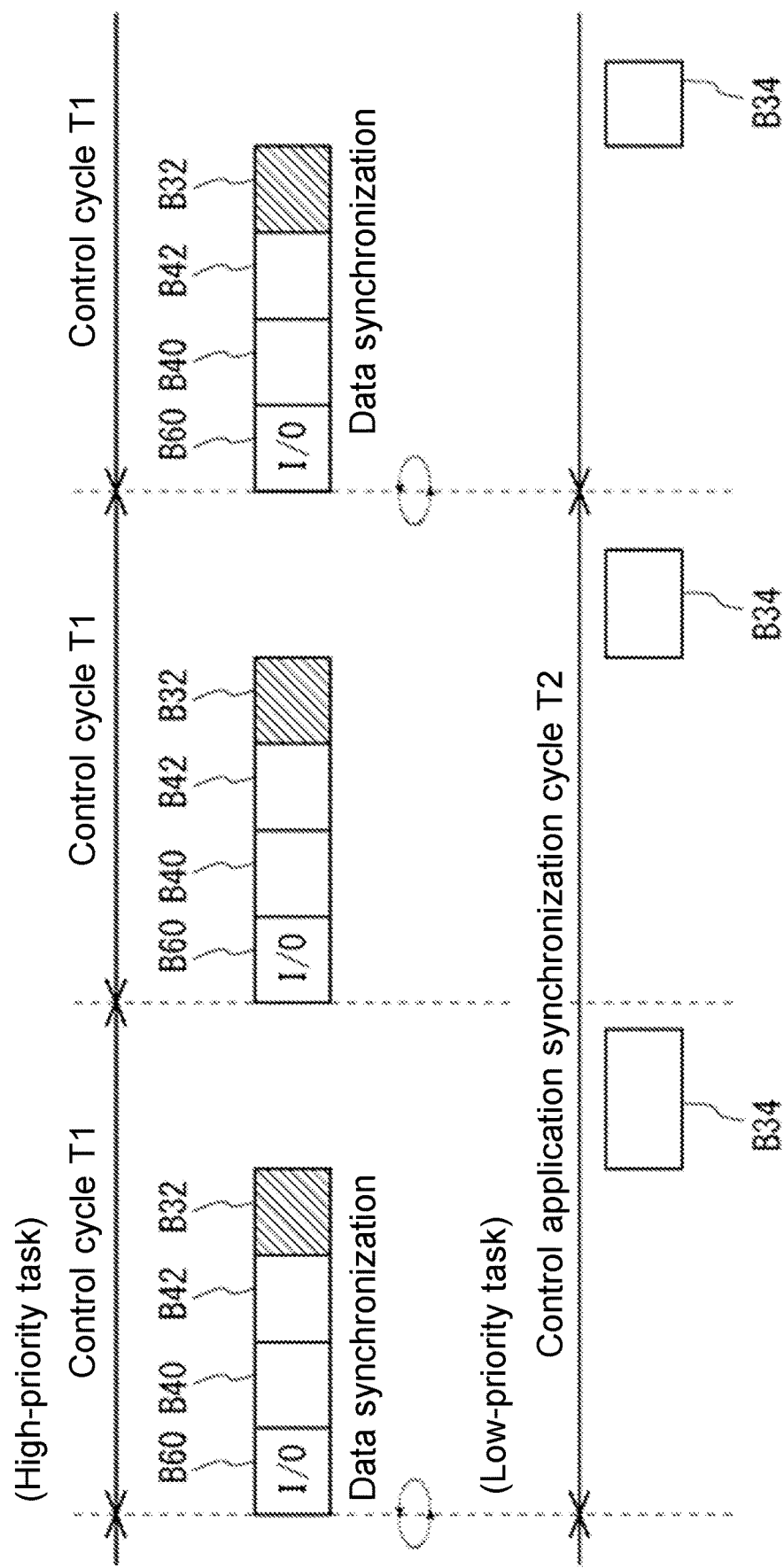
FIG. 3 is a diagram showing a sequence of processing performed by the integrated controller in control cycles.

The times to execute the IEC program 51 and the application program 52 in the control device 100 will now be described in detail with reference to FIG. 3. FIG. 3 is a diagram describing example times to execute the programs in the control device 100. The control device 100 has high-priority tasks (upper process in FIG. 3) with a high priority and a low-priority task (lower process in FIG. 3) with a low priority, which are set based on the processor resource. More specifically, the execution of the subordinate network interface 60, the execution of the IEC program processor 40, the execution of the motion processor 42, and the execution of the motion processor 32 in the control application processor 30 are set as high-priority tasks, and the execution of the interpreter 34 in the control application processor 30 is set as a low-priority task.

More specifically, tasks executed as high-priority tasks include input-output refresh B60 performed by the subordinate network interface 60, execution B40 of the IEC program 51, computation B42 of a command value performed by the motion processor 42 in accordance with the IEC program 51, and computation B32 of a command value performed by the motion processor 32 in accordance with the application program 52. Sequential interpretation B34 of the application program 52 is executed as a low-priority task.

The high-priority tasks are repeatedly executed per predetermined control cycle T1. The low-priority task is executed in each control cycle while the high-priority tasks are not being executed. More specifically, the time to execute the high-priority tasks is allocated to each control cycle, and the low-priority task is executed at a time other than the time to execute the high-priority tasks.

The high-priority tasks will first be described. In each control cycle, the input-output refresh B60 is executed, and then the IEC program processor 40 executes (scans) the overall IEC program 51 to calculate one or more command values for sequence control (execution B40). The motion processor 42 performs a motion process for the motion command contained in the IEC program 51 to calculate one or more command values of the motion command (execution B42). The motion processor 32 in the control application processor 30 prepares a motion command for controlling the robot 210 in accordance with the intermediate code stored in the buffer 33 (execution B32). The same processes are repeated per control cycle. The motion processor 32 may read an intermediate code from the buffer 33 at the time other than every control cycle. The read intermediate code may include commands for calculating command values over multiple control cycles T1. In this case, the intermediate code can be read at a time over the multiple control cycles T1.

In this manner, the high-priority tasks in a control cycle are executed to generate a set of command values. The command values include a command value for the sequence control over, for example, the motor 222, and a command value for the control application of the robot 210. These command values are basically reflected on the field in the subsequent control cycle. In other words, the IEC program processor 40 and the control application processor 30 calculate command values corresponding to input data in the same control cycle, and can thus provide outputs synchronized with the inputs.

For the low-priority task, the interpreter 34 in the control application processor 30 sequentially executes parts of the application program 52. More specifically, the interpreter 34 reads and analyzes the application program 52 with a low priority. The intermediate codes generated by the interpreter 34 analyzing the application program 52 are sequentially stored in the buffer 33 based on the capacity of the buffer 33. The intermediate codes stored in the buffer 33 are sequentially referred to by the motion processor 32 in the control application processor 30, and used to generate command values in the computation B32. In this case, the interpreter 34 pre-generates extra intermediate codes corresponding to an integral multiple of the control cycle as the computation cycle of the high-priority tasks, and thus can calculate the command values for the control application per control cycle without affecting the process performed by the motion processor 32.

Before each predetermined control application synchronization cycle (integral multiple of the control cycle), the interpreter 34 temporarily stops interpretation of the application program 52. At the time of temporary stop, the IEC program processor 40 and the control application processor 30 perform data synchronization with each other to share data consistent for the two processors. The interpreter 34 thus updates data shared with the IEC program processor 40 per synchronization cycle. In addition to updating shared data, the interpreter 34 may also update (synchronize) input data and output data obtained from the field. This allows the control application processor 30 to control the robot 210 using data obtained by the IEC program processor 40. The control application synchronization cycle may have any length corresponding to an integral multiple of the control cycle. The control application synchronization cycle is appropriately set in accordance with, for example, the precision of control intended in the control application.

As shown in FIG. 1, when multiple robots 210 are connected to the control device 100 as control targets of the control device 100, synchronous control can also be performed between the multiple robots 210. When, for example, three robots 210 are connected to the control device 100, synchronous control can be performed between the three robots 210. The motion processor 32 in the control application processor 30 calculates motion commands for controlling the robots 210 in accordance with the intermediate code stored in the buffer 33 as the high priority task, after the input-output refresh B60 is performed in the control cycle T1. The intermediate code is used to perform synchronous control of the multiple robots 210. The calculated motion commands can also be used to perform synchronous control of the multiple robots 210.

First Embodiment

The generator 35 according to a first embodiment will now be described. When synchronous control is performed between the robots 210 and the servo driver 220, for example, (or specifically when the IEC program 51 and the application program 52 are executed in synchronization), or when synchronous control is performed between the robots 210 (or specifically when synchronous control is performed in the application program 52), one of the robots 210 under the synchronous control may be excluded from the synchronous control for some reason. This may occur when, for example, a specific robot 210 is disconnected from the control device 100 for maintenance. Once the specific robot 210 is excluded from the synchronous control in this manner, the robot is a missing target in the synchronous control. In this case, the application program 52 may no longer be executed and the IEC program 51 may no longer be executed in synchronization. To continue the synchronous execution, each program is to be modified to reflect the specific robot 210 being excluded. The workload on the user is not small in this case.

Figure 4:
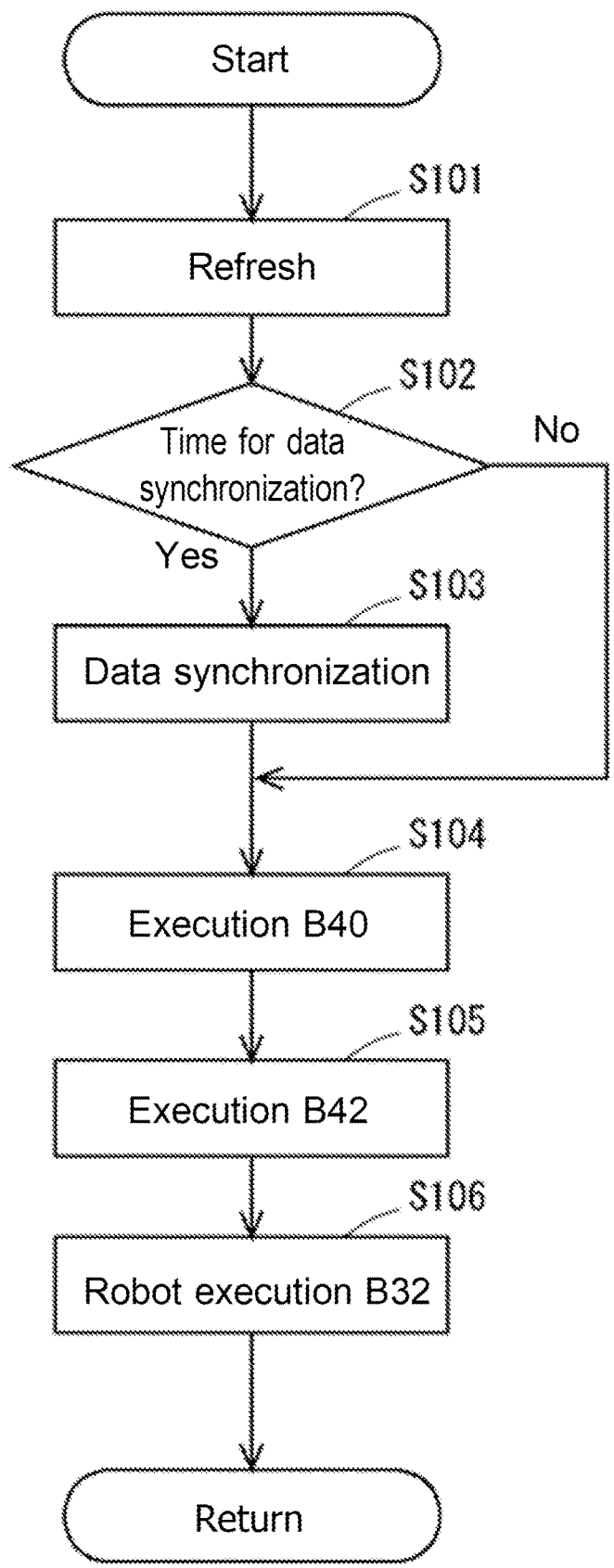
FIG. 4 is a flowchart of first robot control performed by the integrated controller.
Figure 5:
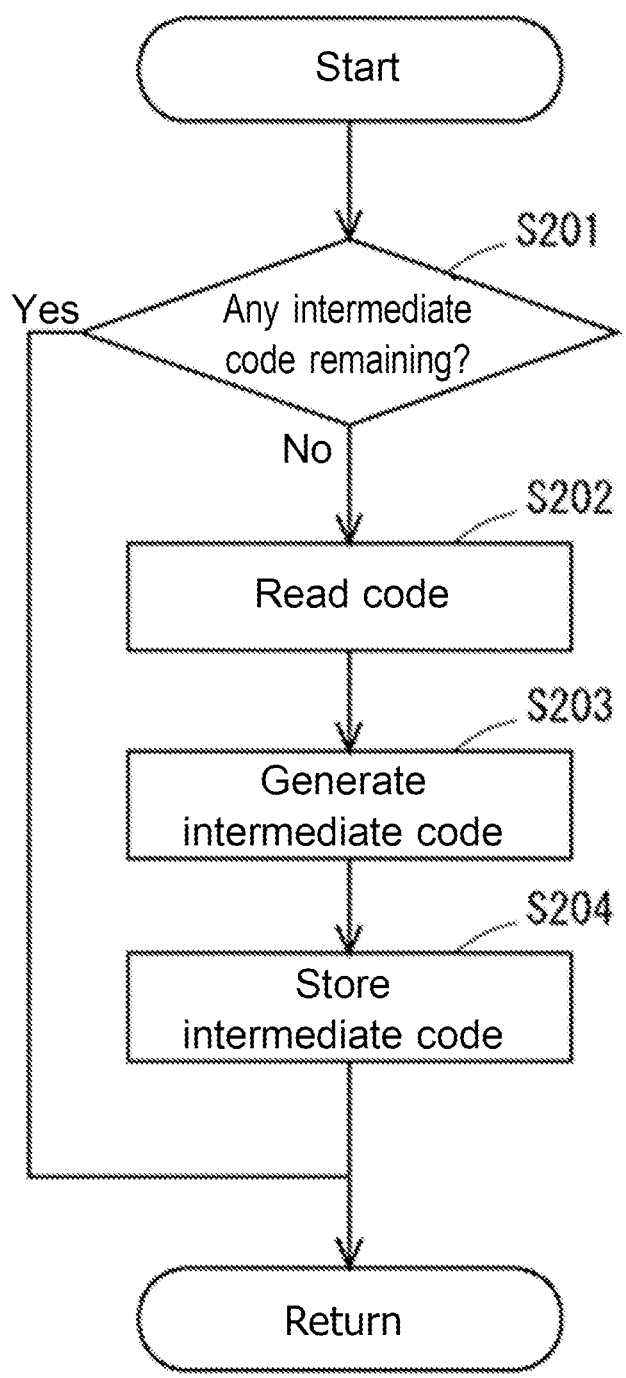
FIG. 5 is a flowchart of second robot control performed by the integrated controller.
Figure 6:
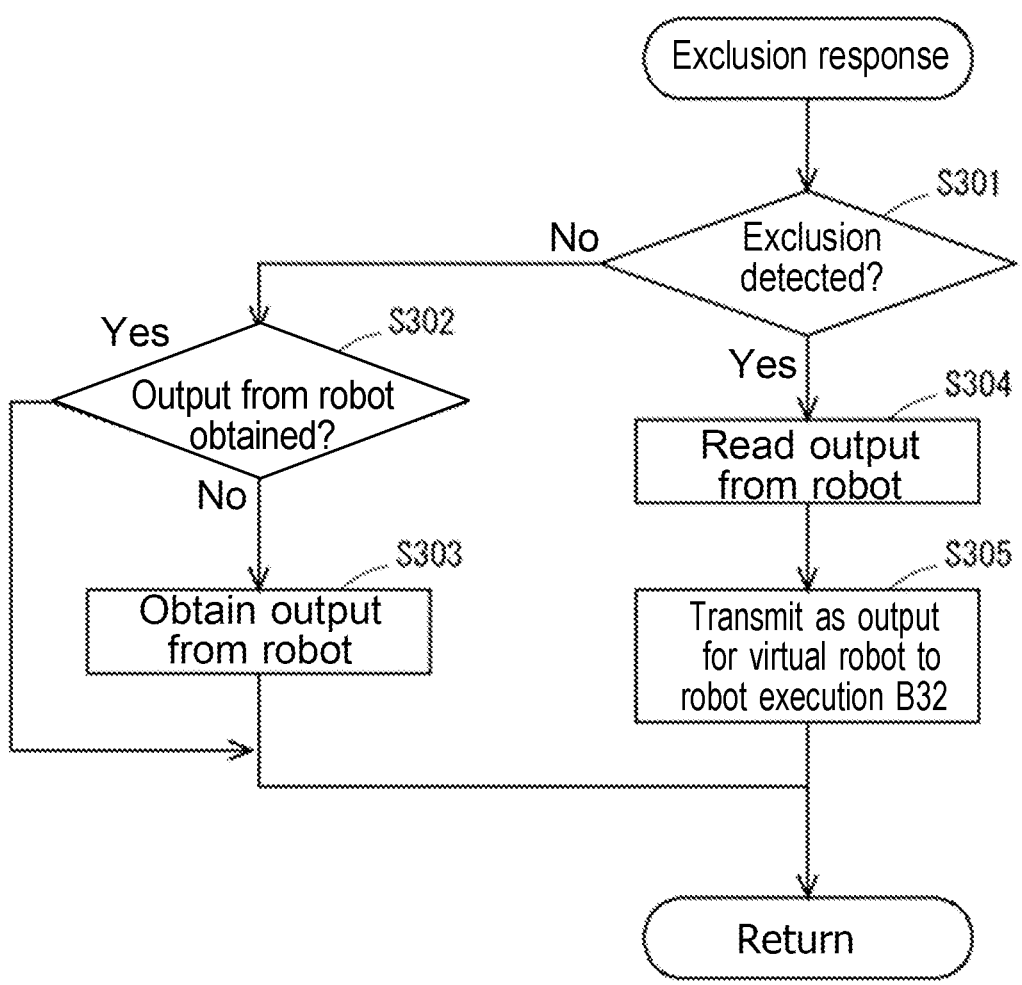
FIG. 6 is a flowchart of third robot control performed by the integrated controller.

The processes shown in FIGS. 4 to 6 are then performed to eliminate the workload on the user in such cases. The processes in FIGS. 4 to 6 are performed when, for example, the specific robot 210 is excluded from the synchronous control performed between the robots 210 and the servo driver 220. FIG. 4 is a flowchart of the process for high-priority tasks described above. FIG. 5 is a flowchart of the process for low-priority tasks described above. FIG. 6 is a flowchart of the process performed when the specific robot 210 is excluded from the synchronous control.

The sequence for high-priority tasks will now be described with reference to FIG. 4. In each control cycle T1, the subordinate network interface 60 performs the input-output refresh (process in S101). This process allows output of the command values (command values from, for example, the processes B40, B42, and B32) calculated in the previous control cycle T1 to, for example, the actuator in each field device and input of data from each field device. Subsequently, in S102, the determination is performed as to whether the current control cycle matches the data synchronization time. In response to an affirmative determination result obtained in S102, data synchronization is performed between the IEC program processor 40 and the control application processor 30 (process in S103). In response to a negative determination result obtained in S102, the processing advances to S104.

The execution B40 is performed in S104, and then the execution B42 is performed in S105. The robot execution B32 is performed in S106 for preparing a motion command for controlling the robot 210. When the specific robot 210 is not excluded from the synchronous control in the robot execution B32, the application program 52 is executed without any change. In contrast, when the specific robot 210 is excluded from the synchronous control, the synchronous control is performed while the process performed by the generator 35 interferes with the application program 52 in an exclusion responding process shown in FIG. 6 (described below).

The command value calculated and prepared in the series of processes for high-priority tasks shown in FIG. 4 is output to the field in the subsequent control cycle T1. After the series of processes and before the subsequent control cycle T1, the low-priority task is performed as shown in FIG. 5.

The sequence for low-priority tasks will now be described with reference to FIG. 5. The low-priority task is performed for the interpreter 34 to interpret the application program 52. In S201, the control application processor 30 determines whether any intermediate code remains in the buffer 33 to avoid generating intermediate codes exceeding the capacity of the buffer 33. In response to an affirmative determination result obtained in S201, the low-priority task ends. In response to a negative determination result obtained in S201, the processing advances to S202. In S202, the interpreter 34 reads a part of the application program 52. For example, the interpreter 34 reads a line of the code included in the application program 52. In S203, the interpreter 34 interprets the read code to generate an intermediate code. The generated intermediate code is stored in the buffer 33 in S204. In response to no application program being available for execution, the processing in S202 to S204 is not performed, and thus no intermediate code is stored in the buffer 33. The low-priority task undergoing the above series of processes is repeated during a period allocated to the low-priority task to execute the program.

The series of processes in FIGS. 4 to 5 allows the IEC program 51 and the application program 52 to be executed in the control device 100 at the execution times shown in FIG. 3. When multiple robots 210 are connected to the control device 100 as shown in FIG. 1, and synchronous control is performed between these robots 210, the application program 52 alone is executed. In the process for high priority tasks without S104 and S105, the robot execution B32 for the synchronous control is performed.

A process performed in response to the specific robot 210 being excluded from the synchronous control (exclusion responding process) will now be described with reference to FIG. 6. The exclusion responding process is performed by the control application processor 30 as part of the high and low priority tasks. In S301, the determination is performed as to whether the specific robot 210 is excluded from the synchronous control. When, for example, synchronous control has previously been performed between the robots 210 and the servo driver 220 or between the multiple robots 210, the specific robot 210 in the synchronous control no longer undergoing the synchronous control performed by the control device 100 is detected as being in an exclusion state. In an example, the exclusion state is detected when the specific robot 210 is no longer connected to the control device 100. The processing advances to S302 in response to a negative determination result obtained in S301, and advances to S304 in response to an affirmative determination result obtained in S301.

In the example described below, the processing advances to S302. In S302, the determination is performed as to whether an output from the robot 210 under the synchronous control has been obtained. The output from the robot 210 herein refers to an output signal for the robot 210 intended for the synchronous control during the application program 52 executed from the beginning through the end of the program. The robot 210 typically has multiple drive joints. When signals associated with, for example, the position and the speed of actuators for the drive joints are used in, for example, a feedback process in the synchronous control, these signals are used as output signals from the robot 210. In response to a negative determination result in S302, the output signals from the robot 210 are obtained in S303. When, for example, multiple robots 210 undergo the synchronous control, output signals from all the robots 210 are obtained. When one robot 210 alone undergoes the synchronous control, an output signal for this robot 210 is obtained. The obtained output signals from the robots 210 are stored in a memory (not shown) included in the control application processor 30. The exclusion responding process ends in response to an affirmative determination result in S302.

In the example below, the processing advances to S304 in response to an affirmative determination result in S301. In S304, when a specific robot 210 being excluded is detected, an output signal for the robot 210 excluded from the synchronous control is read, among the output signals from the robots 210 obtained through the process in S303 described above. The generator 35 reads the output signal.

As the high priority task proceeds, the generator 35 transmits the output from the excluded robot 210 read in S304, or in other words, an output from the robot 210 that has previously undergone the synchronous control, to the robot execution B32 as an output for a virtual robot. Upon a specific robot 210 being excluded from the synchronized control, the generator 35 acts as if the specific robot 210 is not excluded, or specifically, generates an output signal for a virtual robot using the obtained output signal. Thus, although the specific robot 210 is excluded, the application program 52 continues to perform the synchronous control including the specific robot 210 without any modification of the program. The motion processor 32 can then continue to calculate motion commands for the robots 210 to undergo the synchronous control in the same manner as before the specific robot 210 is excluded.

As described above, the generator 35 uses an output signal from the real specific robot 210 to generate an output signal for the virtual robot. When the motion processor 32 calculates motion commands using the output signal for the virtual robot, the commands to perform the synchronous control can be calculated with substantially the same precision as before the specific robot 210 is excluded.

Second Embodiment

Figure 7:
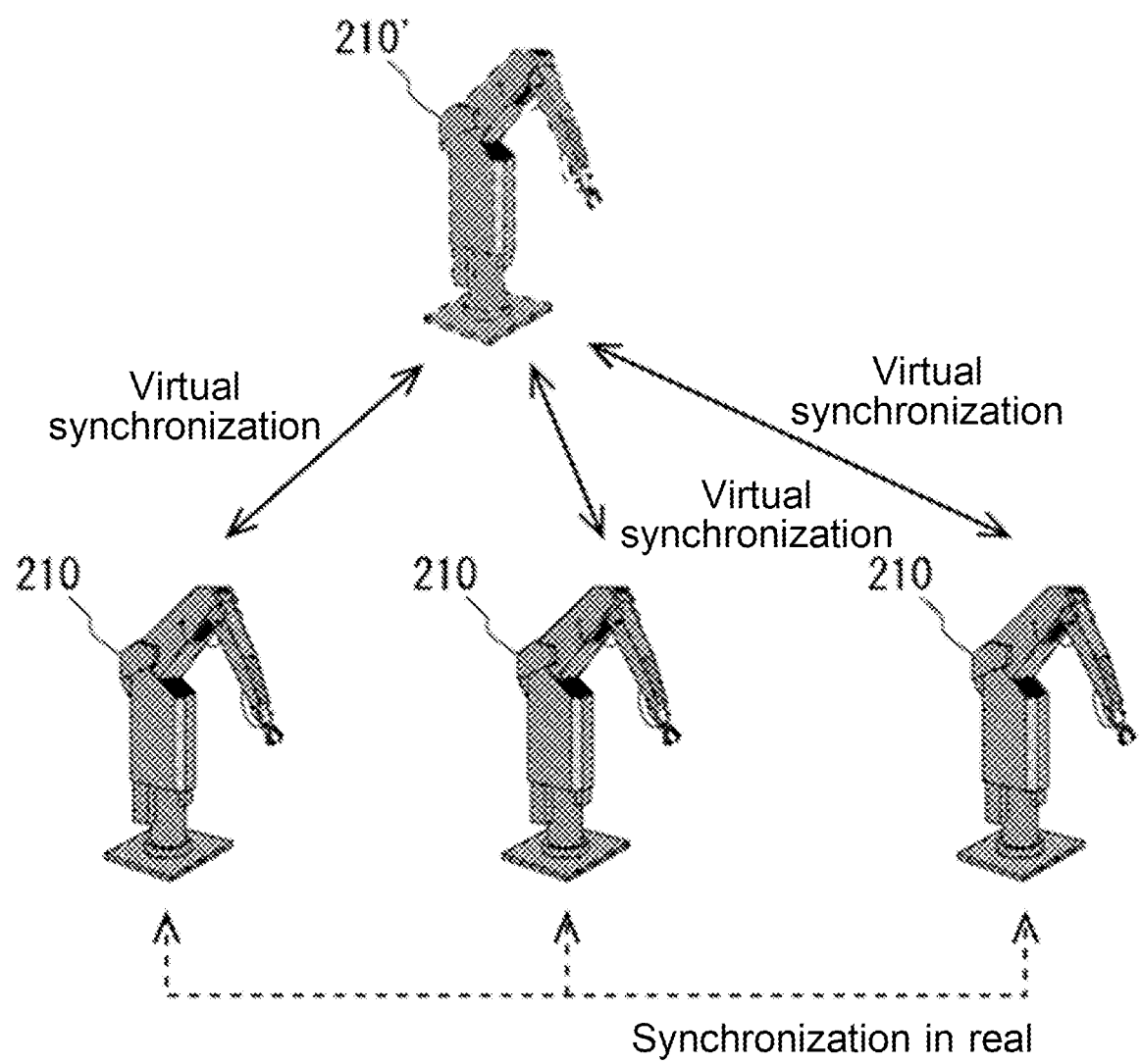
FIG. 7 is a diagram describing synchronous control of robots.

A generator 35 according to a second embodiment will now be described with reference to FIG. 7. As shown in FIG. 1, when synchronous control is performed between the robots 210 (or specifically, synchronous control is performed in the application program 52), the generator 35 can generate an output signal for a virtual robot 210' as a reference to be used in the synchronous control. As shown in FIG. 7, when the virtual robot 210' and each of the real robots 210 undergo synchronous control, all the real robots 210 undergo the synchronous control. In this manner, the synchronous control over multiple robots 210 can be represented by the synchronous control performed between the virtual robot 210' and the respective robots 210, thus reducing the workload to create the application program 52 for the synchronous control. The application program 52 performs synchronous control of robots including the multiple real robots 210 and the virtual robot 210'.

APPENDIX

A control device (100), comprising:
a processor (30) configured to calculate one or more predetermined command values for one or more robots (210) to undergo synchronous control in predetermined control cycles;
an output unit (60) configured to output the one or more predetermined command values in each of the predetermined control cycles; and
a generator (35) configured to generate an output signal for a virtual robot, the virtual robot (210') being virtually defined in relation to the synchronous control,
wherein the processor (30) calculates the one or more predetermined command values using the output signal for the virtual robot generated by the generator (35).

REFERENCE SIGNS LIST 2 field network
6 host network
10 server
30 control application processor
32 motion processor
35 generator
40 IEC program processor
51 IEC program
52 application program
100 control device
210 robot
210' virtual robot
220 servo driver
222 motor

The invention claimed is:
1. A control device, comprising:
a processor configured to calculate one or more predetermined command values for one or more robots to undergo synchronous control in predetermined control cycles;
an output unit configured to output the one or more predetermined command values in each of the predetermined control cycles;

a generator configured to generate an output signal for a virtual robot, the virtual robot being virtually defined in relation to the synchronous control, wherein the processor calculates the one or more predetermined command values using the output signal for the virtual robot generated by the generator;

an obtainer configured to obtain an output signal for a specific robot of the one or more robots in synchronous control of the one or more robots performed through execution of a program; and a detector configured to detect the specific robot of the one or more robots being excluded from the synchronous control, wherein the generator generates the output signal for the specific robot obtained by the obtainer in the synchronous control that has been performed as the output signal for the virtual robot, and in response to the detector detecting the specific robot being excluded, the processor continues to execute the program to control the one or more robots using the output signal for the virtual robot while the specific robot is being excluded to calculate the one or more predetermined command value.

2. The control device according to claim 1, wherein the processor calculates the one or more predetermined command values in each of the predetermined control cycles in accordance with an intermediate code generated by executing a program conforming to a predetermined execution format being executed sequentially and interpreting at least a part of the program with an interpreter, and further executes a program conforming to another execution format being executed fully in execution in each of the predetermined control cycles to calculate another command value for controlling another control target, and the output unit outputs the one or more predetermined command values calculated by the processor to perform synchronous control of the one or more robots and the other control target.

* * * * *